United States Patent
Pavlovic

(10) Patent No.: US 7,322,861 B2
(45) Date of Patent: Jan. 29, 2008

(54) POWER SUPPLY CIRCUIT FOR REMOVABLE AUTOMOTIVE INTERIOR SYSTEMS WITH INTEGRATED SWITCHING FUNCTION

(75) Inventor: Slobadan Pavlovic, Canton, MI (US)

(73) Assignee: Lear Corporation, Southfield, MI (US)

( * ) Notice: Subject to any disclaimer, the term of this patent is extended or adjusted under 35 U.S.C. 154(b) by 85 days.

(21) Appl. No.: 11/286,503

(22) Filed: Nov. 23, 2005

(65) Prior Publication Data

US 2007/0117426 A1    May 24, 2007

(51) Int. Cl.
*H01R 13/24* (2006.01)
(52) U.S. Cl. .......................... 439/700; 349/34
(58) Field of Classification Search ................ 439/700, 439/824, 34, 271
See application file for complete search history.

(56) References Cited

U.S. PATENT DOCUMENTS

| | | | |
|---|---|---|---|
| 3,641,479 A * | 2/1972 | O'Brien et al. ............. | 439/277 |
| 5,752,845 A * | 5/1998 | Fu .............................. | 439/247 |
| 5,890,779 A | 4/1999 | Blackburn et al. | |
| 6,050,835 A | 4/2000 | Henrion et al. | |
| 6,250,703 B1 | 6/2001 | Cisler et al. | |
| 6,334,796 B1 * | 1/2002 | Fromme et al. ............. | 439/700 |
| 6,447,343 B1 * | 9/2002 | Zhang et al. ................ | 439/700 |
| 6,485,080 B2 | 11/2002 | Hansen et al. | |
| 6,498,506 B1 | 12/2002 | Beckous | |
| 6,663,157 B1 | 12/2003 | Hofmann et al. | |
| 6,752,445 B1 | 6/2004 | Koehler et al. | |
| 6,878,016 B2 | 4/2005 | Wulff et al. | |

\* cited by examiner

*Primary Examiner*—Hien Vu
*Assistant Examiner*—X. Chung-Trans
(74) *Attorney, Agent, or Firm*—MacMillan, Sobanski & Todd, LLC

(57) ABSTRACT

An electrical power supply system includes a vehicle interior trim member selectably mountable to a vehicle interior. The vehicle interior trim member includes an electrical load device and a releasable connector having a fixed terminal contact for receiving power for powering the electrical load device. A power supply connector is fixedly mounted to the vehicle interior and is releasably attachable to the releasable connector for supplying power from the power supply to the electrical load device. A retractable terminal contact of the power supply connector is in a retracted position for receiving power from the power supply when the vehicle interior trim member is selectively attached to the vehicle. The retractable terminal contact being in an extended position and being disconnected from the power supply when the releasable connector is disconnected from the power supply connector in response to the vehicle interior trim member selectively detached from the vehicle.

20 Claims, 4 Drawing Sheets

POWER SUPPLY CIRCUIT FOR REMOVABLE AUTOMOTIVE INTERIOR SYSTEMS WITH INTEGRATED SWITCHING FUNCTION

STATEMENT REGARDING FEDERALLY SPONSORED RESEARCH OR DEVELOPMENT

Not Applicable

CROSS-REFERENCE TO RELATED APPLICATIONS

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates in general to vehicle interior power supply connections for interior trim members of a vehicle, and more specifically, to a disconnectable power supply circuit for a detachable interior trim member of a vehicle such as a vehicle seat.

2. Description of the Related Art

Some vehicle interior systems such as passenger seats can be made removable from a vehicle and/or stowable in the vehicle. Vehicle seats which include electrical load devices such as heating elements or motors for moving portions of the seats require power be supplied to the vehicle seat through an electric connection. Typically the floor area is the only suitable location for making the electrical connection between a power supply connector and a releasable connector incorporated within the vehicle seat. For vehicle seats that are removable, stowable, or pivotable to a tilt forward position, a mating portion of the electrical interconnection must also be detachable to allow the vehicle seat to be removed, stowed, or pivoted fully forward.

In an electrical connection system which automatically connects and disconnects the mating connectors when the vehicle seat is removed from its position, an exposed power supply connector is present when the seat is removed. The exposed electrical contact is susceptible to a short circuit caused by the electrical contacts coming into contact with a foreign object or by a person, in addition to damage caused by impacts to the contact from the person or object. Furthermore, being that the electrical connection to a vehicle seat is typically made at the floor level, an exposed connector may be susceptible to debris and liquids spilled on the floor which may lead to the corrosion or damage to the electrical contact.

BRIEF SUMMARY OF THE INVENTION

This invention has the advantage of automatically connecting or disconnecting power to a power supply connector without remote power switching in response to the vehicle interior trim component being unlatched from a latched position. Power is automatically disconnected to an exposed terminal contact of a power supply connector in response to the vehicle interior trim being unlatched from the latched position. Power is automatically connected to the power supply connector when the releasable connector is connected to the power supply connector in response to the vehicle interior trim member being in the latched position.

In one aspect of the invention, an electrical power supply system includes a vehicle interior trim member selectably mountable to a vehicle interior. The vehicle interior trim member includes an electrical load device and a releasable connector having a fixed terminal contact for receiving power for powering the electrical load device. A power supply connector fixedly, mounted to the vehicle interior and adapted to be electrically coupled to a power supply, includes a retractable terminal contact for contacting the fixed terminal contact. The power supply connector being releasably attachable to the releasable connector for supplying power from the power supply to the electrical load device. The releasable connector is connected to the power supply connector when the vehicle interior trim member is selectively attached to the vehicle and the retractable terminal contact is in a retracted position for receiving power from the power supply. The releasable connector is disconnected from the power supply connector when the vehicle interior trim member is selectively detached from the vehicle. The retractable terminal contact is in an extended position and is disconnected from the power supply in response to the power supply connector being disconnected from the releasable connector.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
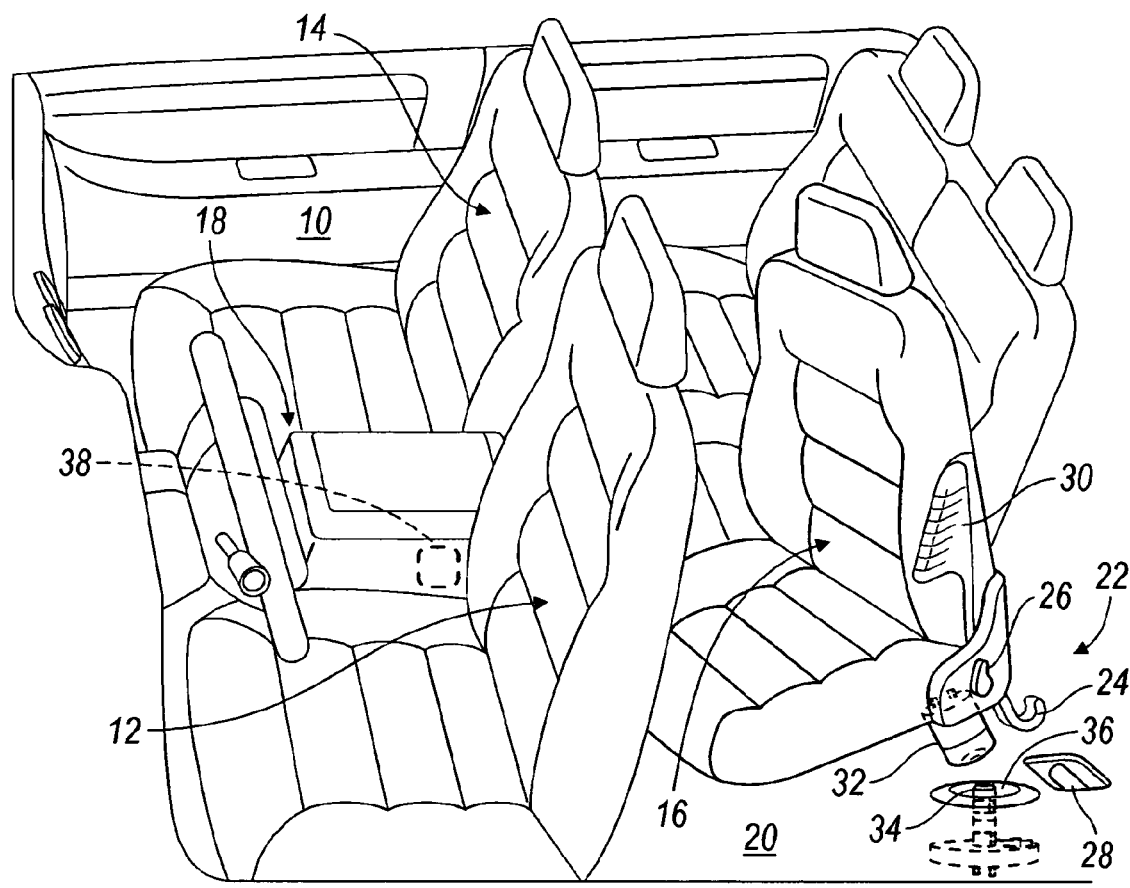
FIG. 1 is a view of an interior compartment of a vehicle illustrating detachable interior trim members according to a preferred embodiment of the present invention.

Referring now to the drawings, there is illustrated in FIG. 1 an interior of a vehicle shown generally at 10. The interior of the vehicle 10 includes a driver's seat 12, a front passenger's seat 14, a rear passenger seat 16, and a front center console 18 that are mounted to a vehicle floor shown generally at 20.

The rear passenger seat 16 includes a latch mechanism 22 disposed on a bottom corner of the rear passenger seat 16. The latch mechanism 22 includes a latch 24 and latch release lever 26. The latch mechanism 22 is typically spring-loaded to allow the latch to move into position for engaging a catch 28 mounted in the vehicle floor 20. The latch 24 is unlatched for allowing the rear passenger seat to be moved. For example, the rear passenger seat 16 may be pivoted forward to allow a person access to the rear of the rear passenger seat 16, stowing the rear vehicle seat 16 in a stowable compartment (not shown), or removing the rear passenger seat 16 from the vehicle interior.

The rear passenger seat 16 further includes an electrical load device 30, such as a vehicle seat warmer. The electrical load device 30 may further other types of electrical load devices such as a seat motor for adjusting a backrest or lumbar. A releasable connector 32 is mounted on a bottom portion of the vehicle seat 16 for receiving and supplying power to the electrical load device 30 and is moveable with the rear passenger seat 16 as the seat is moved.

The vehicle floor 20 includes a power supply connector 34 for providing power to the releasable connector 32 when electrically coupled. The power supply connector 34 is fixedly mounted in the vehicle floor 20.

The releasable connector 32 of the rear vehicle seat 16 is in electrical contact with the power supply connector 34 when rear vehicle seat 16 is in a latched position. As the rear passenger seat 16 is moved to the latch position, the releasable connector 32 mates the with power supply connector 34. Power is only connected to the power supply connector during the coupling of the power supply connector 34 and the releasable connector 32. This prevents a person or object from contacting the electrical connection when energized.

FIG. 1 further shows an interior trim member such as the front center console 18 that is detachable from the vehicle interior compartment 10. The front center console 18 may include an electrical load device such as a multimedia device (i.e., DVD player for viewing movies or a CD magazine rack for playing audio). The front center console 18 or a portion thereof may be detachable to allow the electrical load device to be removed from the vehicle. The front center console 18 includes an electrical connection, shown generally at 38, that is similar to the electrical connection described above. When the front center console 18 is mounted to the floor 20 or other adjacent structure, an electrical connection is made between the two mating connectors. When the front center console 18 is detached from the floor 20 or other adjacent structure, the center console power supply connector is recessed within the floor 20 to avoid contact or interference with any exterior objects or passengers.

Figure 2:
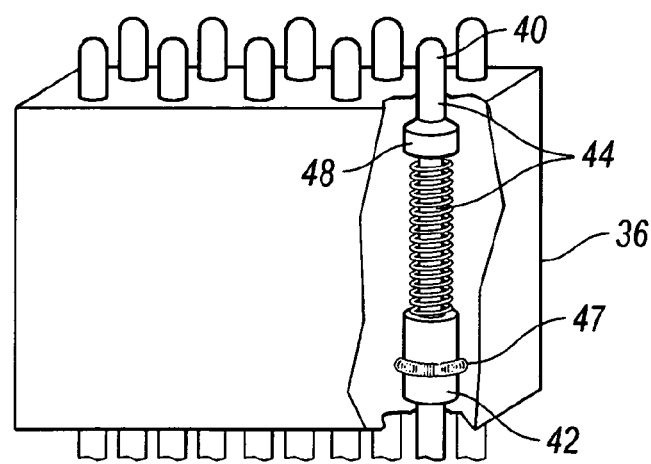
FIG. 2 is a perspective view of a power supply connector of the present invention.
Figure 3:
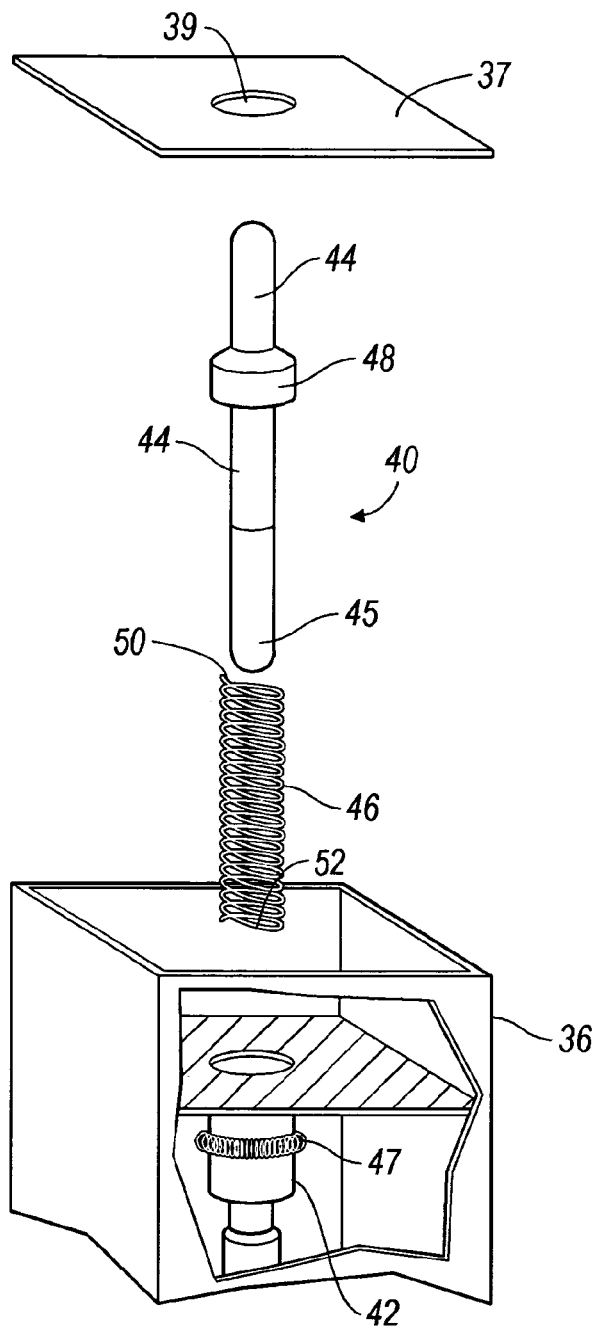
FIG. 3 is an exploded view of a retractable terminal contact of the present invention.
Figure 4:
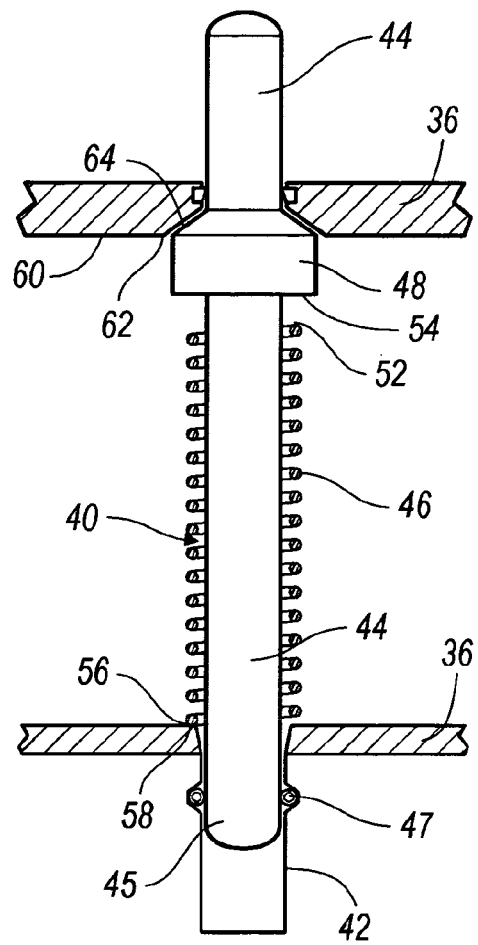
FIG. 4 is a cross section of the male terminal contacts of the power supply connector of the present invention.

Referring now to FIGS. 2, 3 and 4, the power supply connector 34 includes a plastic housing 36 for encasing the electrical and mechanical members of the power supply connector 34. A housing fascia 37 forms a top portion of the plastic housing 36. The housing fascia 37 includes an aperture 39 for allowing a mating connection between a respective contact of the power supply connector 34 and a respective contact of the retractable connector 32. A seal 41 is disposed around the perimeter of the aperture 39.

A retractable terminal contact 40 and a terminal receptor 42 are disposed within the plastic housing 36. The terminal receptor 42 is a fixed conductive barrel-like structure for receiving the retractable terminal contact 40. The terminal receptor 42 is preferable tubular for slidingly receiving the retractable tubular contract 40. The terminal receptor 42 includes a conductive spring 47 concentrically formed about the inner circumference of the terminal receptor 42 for making electrical contact with the retractable terminal contact 40 therein. The conductive spring 47 is preferably made from a material having high conductive properties (e.g., copper alloy), or alternatively, coated with a highly conductive material. The terminal receptor 42 is electrically connected to a power source such as an energy storage device (e.g., vehicle battery) or energy generating device (e.g., alternator).

The retractable terminal contact 40 is a pin-like plunger that is preferably cylindrical with spherical ends for transitioning through the terminal receptor 42 and the aperture 39. The retractable terminal contact 40 includes a conductive section 44 and a nonconductive section 45. The nonconductive section 45 is formed on a lower portion of the retractable terminal contact 40. The retractable terminal contact 40 includes an abutment portion 48. The abutment portion 48 is preferably integrally formed on the circumference in an upper portion of the retractable terminal contact 40. Alternatively, the abutment portion 48 may be formed separately and coupled to the retractable terminal contact 40.

A compression spring 46 is axially disposed around the exterior of the retractable terminal contact 40. A first end 52 of the compression spring 46 abuts a bottom side surface 54 of the abutment portion 48. A second end 56 of the compression spring 46 abuts a lower interior surface 58 of the plastic housing 36. As the retractable terminal contact 40 is retracted below the housing fascia 36, the compression spring 46 is placed into a state of compression in response to the forces exerted on the ends of the compression spring 46 by the abutment portion 48 and the lower interior surface 58. When the compression spring 46 is in its uncompressed (pre-compressed) state, the compression spring 46 maintains the retractable terminal contact 40 in an extended position. The compression spring 46 is made from a material exhibiting strong mechanical wear (e.g., steel) since the compression spring 46 is required only for the resistive force to move the retractable terminal contact 40 up and down in contrast to the conductive spring 47 which must exhibit good electrical conductive properties.

An underside portion 60 of the housing fascia 37 includes a chamfer 62 surrounding the aperture 39. An upper side surface 64 of the abutment portion 48 is angled to so that abutment portion 48 aligns and recesses into the chamfer 39 of the housing fascia 37. The abutment portion 48 prevents the compression spring 46 from moving the retractable terminal contact 40 completely out of the plastic housing 36.

Figure 5:
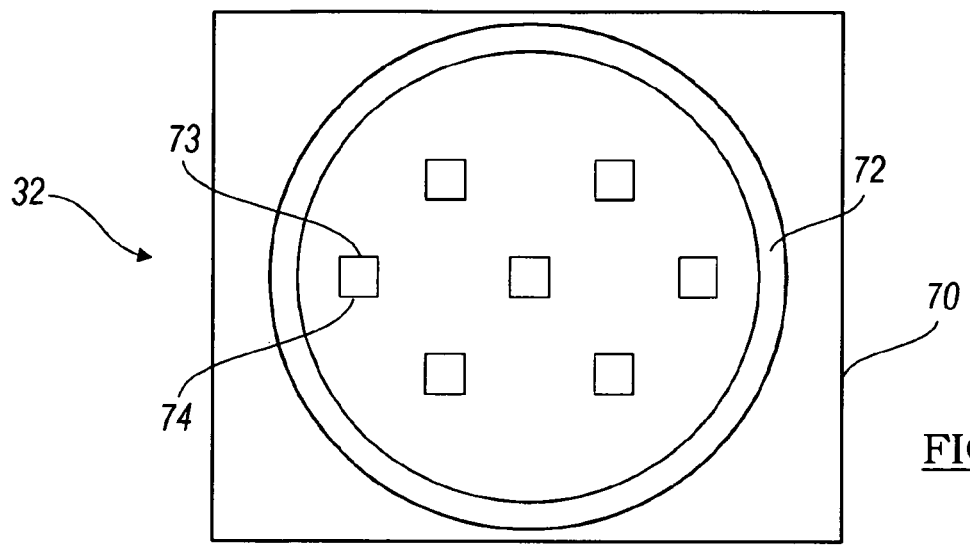
FIG. 5 is a plan view of the power supply connector of the present invention.

FIG. 5 illustrates a top view of the releasable connector 32. The releasable connector 32 includes a connector housing 70 for housing electrical components. A plurality of fixed terminal contacts 73 is electrically connected to the electronic display device 30 for supplying power to the electrical load device 30. Preferably, each fixed terminal contact 73 includes a fixed conductive terminal pad 74 formed at an end of the fixed terminal contact 73 that is exposed to the exterior of the releasable connector 32 for contacting the respective terminals of the power supply connector 34. The fixed terminal conductive pads 74 are molded in spaced relation to one another within an insulator 76 for electrically isolating each of the fixed terminal conductive pads 74. Preferably, an exposed portion of each fixed terminal conductive pad 74 is conductively plated for mating with the respective terminals of the power supply connector 32. Alternatively, the entire fixed terminal conductive pad 74 may be plated. The plated material (e.g. copper alloy) is selected that exhibits good electrical conductive properties in addition to a creating durable contact surface for mating and unmating the respective connectors multiple times.

Preferably the fixed terminal conductive pad 74 is a flat planar surface. Each fixed terminal conductive pad 74 is preferably flush with insulator 76 surface area. The flat planar surface of the fixed terminal conductive pad 74 allows for an even and uniform mating surface when electrically contacting a respective terminal of the power supply connector 34.

A face seal 72 is disposed along a perimeter of the plurality of the fixed terminal contacts of the connector housing 70. The face seal 72 creates a hermetic seal about the interconnecting terminals of the power supply connector 34 and the releasable connector 32 when connected.

Figure 6:
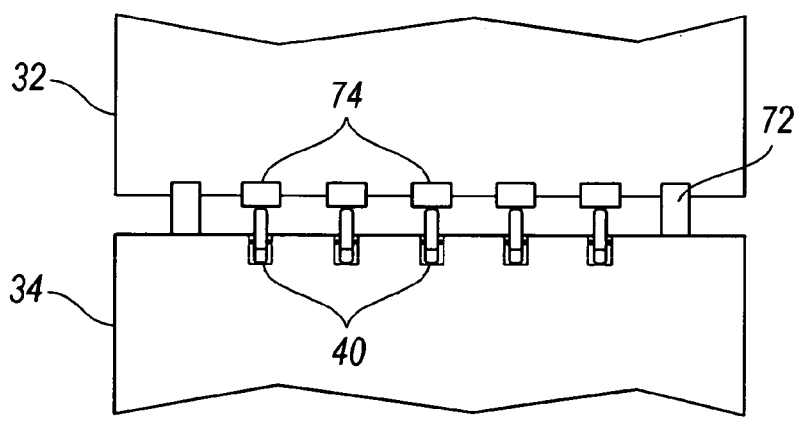
FIG. 6 is a side view of a connection of the power supply connector and the releasable connector of the present invention.

FIG. 6 illustrates an interconnection between the power supply connector 34 and the releasable connector 32. As the retractable connector 32 is connected to the power supply connector 34, each retractable terminal contact 40 is retracted substantially below the housing fascia 37 in response to the force exerted by each fixed terminal conductive pad 74 acting on each retractable terminal contact 40. As the each retractable terminal contact is retracted substantially below the housing fascia 37, the face seal 72 of the retractable connector 32 makes contact with the housing fascia 37 of the power supply connector 34 for hermetically sealing the connection. In addition, each retractable terminal contact 40 is electrically coupled to power when each retractable terminal contact 40 reaches the retracted position.

Referring again to FIG. 3, the retraction of the retractable terminal contact is described. When the retractable terminal contact 40 is in the extended position, only the nonconductive section 45 of the retractable terminal contact 40 is in contact with the conductive spring 47 of the terminal receptor 42. As a result, power is disconnected to the retractable terminal contact 40. As the retractable terminal contact 40 is retracted, retractable terminal contact 40 descends into the plastic housing 36. The underside portion 54 of the abutment surface 48 exerts a force on the first end 52 of the compression spring 46. The lower interior surface 58 of the plastic housing 36 fixedly abuts the second end 54 of the compression spring 46 thereby causing the compression spring 46 to compress as the retractable terminal contact 40 is retracted. The compression spring 46 maintains an opposing force against the underside portion 54 of the abutment portion 48 while the retractable terminal contact 40 is in a retracted state.

As the retractable terminal contact 40 extends to the retracted position, a lower portion of the retractable terminal contact 40 extends into the terminal receptor 42. As the retractable terminal contact 40 reaches the retracted position, the conductive section 44 contacts the conductive spring 47 of the terminal receptor 42 and connects power to the retractable terminal contact 40. When the retractable connector 34 is released from the power supply connector 32, the compression spring 46 returns to an uncompressed (or pre-compressed) state forcing the retractable terminal contact 40 to its extended position. When moving from the retracted position to the extended position, the retractable terminal contact 40 ascends through the aperture 39 thereby exposing an upper portion of the conductive section 44 of the retractable terminal contact 40 above the housing fascia 37. In addition, the conductive section 44 of the retractable terminal contact slidingly disengages from contact with the conductive spring 47 and the nonconductive section 45 slidingly contacts the conductive spring 47. Power is disconnected from the retractable terminal contact 40 as a result of the conductive spring 47 being in contact with the nonconductive section 45.

The seal 41 is in contact with the retractable terminal contact 40 and wipes the outer surface of the retractable terminal contact 40 from debris and contaminants when the retractable terminal contact 40 moves between the retracted position and the extended position.

Figure 7:
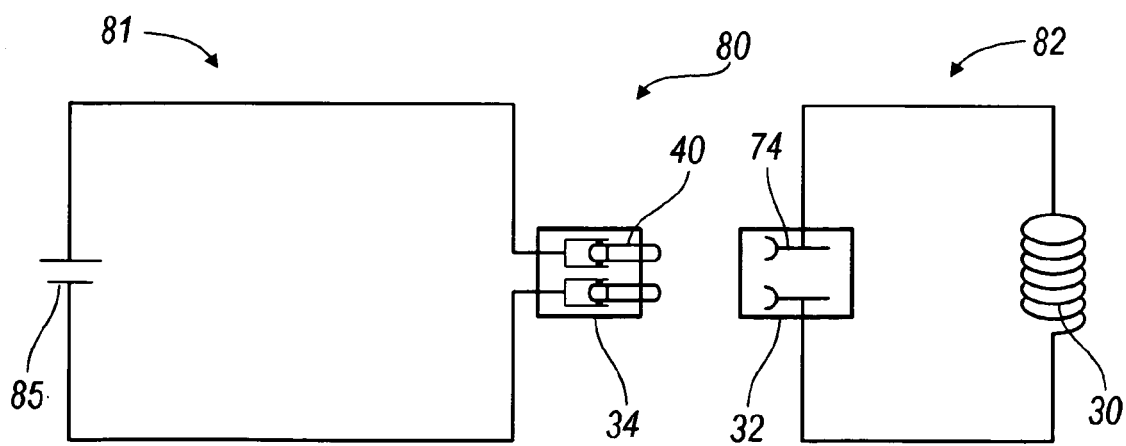
FIG. 7 is an electrical schematic of the electrical supply system circuit according to a preferred embodiment of the present invention.

FIG. 7 illustrates a schematic of an electrical supply system 80. The electrical supply system 80 includes a power supply circuit 81 and a releasable supply circuit 82. The power supply circuit 82 includes a power supply source 85, the releasable connector 32, and the power supply connector 34. The power supply source 85 may be an energy storage device such as a battery or an energy generating device such as an alternator. In the preferred embodiment, the power source 85 is electrically connected to the power supply connector 34.

The releasable supply circuit 82 includes the releasable connector 32 and the electrical load device 30. The releasable connector 32 is re-connectable with the power supply connector 34 for receiving power from the power supply circuit 81. The retractable terminal contacts 40 contact the fixed terminal conductive pads 74 when the releasable connector 32 and the power supply connector 34 are connected to one another. The coupling of the releasable connector 32 and the power supply connector 34 retract spring-like the retractable terminal contacts 40 for electrically connecting the power from the power supply 85. The electrical supply system circuit becomes a closed circuit for providing power from the power supply connector 85 to the electrical load device 30. The releasable supply circuit 82 may include a passenger operated switch electrically coupled between the releasable connector 32 and the electrical load device 30 for selectively powering the electrical load device when power is provided to the releasable connector 32.

Figure 8:
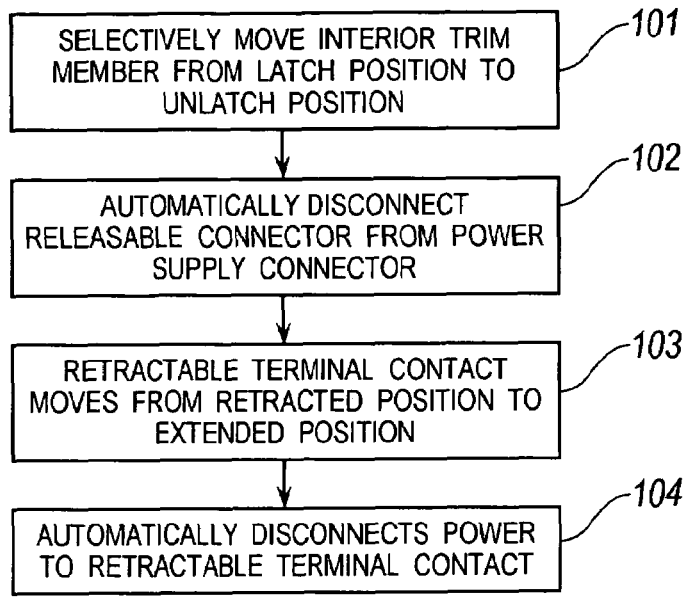
FIG. 8 is a flowchart for disconnecting power to the retractable terminal contact of the present invention.

FIG. 8 illustrates a method for powering-off the power supply connector. In step 101, the interior trim member is moved from the latched position to the unlatched position. In step 102, the power supply connector is automatically disconnected from the releasable connector in response to moving the interior trim member to the unlatched position. In step 103, the retractable terminal contact within the power supply connector moves from the retracted position to the extended position in response to the releasable connector disconnecting from the power supply connector. In step 104, the power is automatically disconnected to the retractable terminal contact in response to the retractable terminal contact moving from the retracted position to the extended position.

Figure 9:
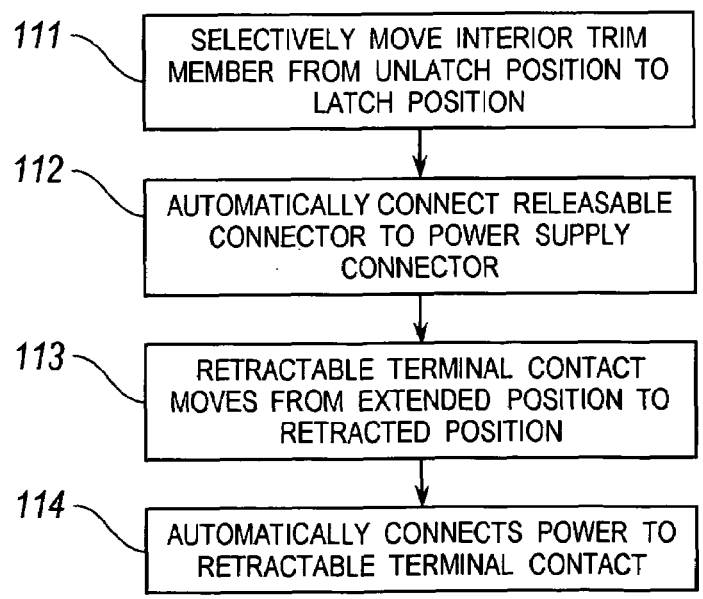
FIG. 9 is a flowchart for connecting power to the retractable terminal contact of the present invention.

FIG. 9 illustrates a method for powering on the power supply connector. In step 111, the interior trim member is moved from the unlatched position to the latched position. In step 112, the power supply connector is automatically connected from the releasable connector in response to the latching of the interior trim member. In step 113, the retractable terminal contact within the power supply connector moves from the extended position to the retracted position in response to the releasable connector connecting to the releasable connector. In step 114, power is connected to the retractable terminal contact in response to the retractable terminal contact moving from the extended position to the retracted position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical power supply system comprising:
a vehicle interior trim member selectably mountable to a vehicle interior, said vehicle interior trim member including an electrical load device and a releasable connector having a fixed terminal contact for receiving power for powering said electrical load device;
a power supply connector fixedly mounted to said vehicle interior and adapted to be electrically coupled to a power supply, including a retractable terminal contact for contacting said fixed terminal contact and for supplying power to said retractable connector, said retractable terminal contact having a conductive section and a non-conductive section, said power supply connector being releasably attachable to said releasable connector; and
wherein said releasable connector is connected to said power supply connector when said vehicle interior trim member is selectively attached to said vehicle, said conductive section of said retractable terminal contact receiving power from said power supply when said retractable terminal contact is in a retracted position, wherein said releasable connector is disconnected from said power supply connector when said vehicle interior trim member is selectively detached from said vehicle, and wherein said retractable terminal contact is in an extended position and said non-conductive section of said retractable terminal contact disconnects power from said power supply in response to said power supply connector being disconnected from said releasable connector.

2. The system of claim 1 wherein said power supply connector further includes a seal in contact with said retractable terminal contact, said seal wiping said retractable terminal contact as said retractable terminal contact moves between said extended position and said retracted position.

3. The system of claim 2 wherein a portion of said retractable terminal contact extends above said seal when in said extended position, said power to said retractable terminal contact then being disconnected.

4. The system of claim 3 wherein substantially all of said retractable terminal contact is retracted below said seal when in said retracted position.

5. The system of claim 1 wherein said fixed terminal contact of said releasable connector includes a fixed conductive terminal pad for contacting an end of said retractable terminal contact, wherein said fixed conductive terminal pad forcibly retracts said retractable terminal contact as said releasable connector is connected to said power supply connector.

6. The system of claim 1 wherein said releasable connector includes a face seal for sealing said interconnection of said fixed conductive terminal pad and said retractable terminal contact when said releasable connector is connected to said fixed terminal connector.

7. The system of claim 1 further comprising a spring axially disposed around an exterior of said retractable terminal contact for maintaining said retractable terminal contact in said extended position when said vehicle interior trim member is attached to said vehicle interior.

8. A power supply connector adapted to provide power to a mating connector for powering an electrical load device disposed within a vehicle interior trim member, said power being enabled in said power supply connector when said vehicle interior trim member is attached to a vehicle interior and is disabled in said power supply connector when said vehicle interior trim member is detached from said vehicle interior trim member, said power supply connector including:
a connector housing fixed mounted to said vehicle interior;
a retractable terminal contact having a conductive section and a nonconductive section, said retractable contact being movable within said connector housing between a retracted position and an extended position;
a spring axially disposed around an exterior of said retractable terminal contact for maintaining said retractable terminal contact in said extended position when said vehicle interior trim member is detached from said vehicle interior;
a terminal receptor for receiving an end of said retractable terminal contact, wherein said terminal receptor is adapted to be electrically coupled to a power source for receiving said power;
wherein said nonconductive section contacts said terminal receptor when said retractable terminal contact is in said extended position for disconnecting power to said retractable terminal connector, and wherein said conductive section contacts said terminal receptor when said retractable terminal contact is in said retracted position for connecting power to said retractable terminal contact.

9. The power supply connector of claim 8 further comprising a seal for wiping said retractable terminal contact as said retractable terminal contact moves between said extended position and said retracted position.

10. The power supply connector of claim 9 wherein said retractable terminal contact is substantially submerged below said seal when in said retracted position.

11. The power supply connector of claim 8 wherein said terminal receptor includes a conductive spring for making electrical contact with said conductive section as said retractable terminal contact slidingly moves to said retractable contact.

12. The method for controlling power to a power supply connector of an electrical supply system for powering an electrical load device disposed within a vehicle interior trim member, wherein said power is disconnected to said power supply connector when said vehicle interior trim member is selectively detached from a vehicle interior mount, and wherein said power is supplied to said power supply connector when said vehicle interior trim member is selectively attached to said vehicle interior mount, said method comprising the steps of:
providing a releasable connector having a fixed conductive terminal pad electrically coupled to said electrical load device of said vehicle interior trim member;
providing a power supply connector fixedly mounted to a vehicle interior, said power supply connector including a retractable terminal contact, said retractable terminal contact including a conductive section for connecting power to the power supply connector and a non-conductive section for disconnecting power from the power supply;
selectively attaching said vehicle interior trim member to said vehicle interior mount;
automatically contacting said retractable terminal contact with said fixed conductive terminal pad in response to selectively mounting said vehicle interior trim member to said vehicle interior mount;
retracting said retractable terminal contact to a retracted position, wherein said conductive section of said retractable terminal contact electrically connects power to said power supply connector for energizing said electrical load device.

13. The method of claim 12 further comprising the steps of:
selectively detaching said vehicle interior trim member from said vehicle interior mount;
automatically disconnecting said retractable terminal contact from said fixed conductive terminal contact in response to selectively detaching said vehicle interior trim member from said vehicle interior mount;
extending said retractable terminal contact to an extended position, wherein said non-conductive section of said retractable terminal contact disconnects power to said power supply connector.

14. The method of claim 12 wherein said step of retracting said retractable terminal contact to a retracted position includes said conductive section contacting a terminal receptor when in said retracted position for connecting power to said power supply connector.

15. The method of claim 14 wherein a conductive spring of said terminal receptor contacts said conductive section when said retractable terminal contact retracts to said retracted position.

16. The method of claim 12 wherein said step of extending said retractable terminal contact to an extended position includes said non-conductive section contacting a terminal receptor when in said extended position for disconnecting power to said power supply connector.

17. The method of claim 12 wherein said step of retracting said retractable terminal contact to a retracted position includes said retractable terminal contact slidingly contacting a seal disposed in said power supply contact for wiping said retractable terminal contact.

18. The method of claim 17 wherein a portion of said retractable terminal contact extends above said seal when in said extended position.

19. The method of claim 17 wherein substantially all of said retractable terminal contact is retracted below said seal when in said retracted position.

20. The method of claim 12 wherein a spring exerts a resistive force on said retractable terminal contact as said retractable terminal contact is moved to said retracted position.

* * * * *